Patented June 29, 1954

2,682,561

UNITED STATES PATENT OFFICE 2,682,561

DIARYL NEOPENTANE COMPOSITIONS

Edward F. Rogers, Middletown, and Horace D. Brown, Plainfield, N. J., assignors to Merck & Co., Inc., Rahway, N. J., a corporation of New Jersey No Drawing. Application February 16, 1950, Serial No. 144,591

2 Claims. (Cl. 260—612)

This invention relates to the new chemical compounds 1,1-bis(p-methylphenyl)-2,2-dimethyl propane and 1,1-bis(p-methoxyphenyl)-2,2-dimethyl-propane and to the process of preparing these compounds. It is also concerned with the preparation of certain novel chemical compounds, produced as intermediates in the synthesis of 1,1-bis(p-methylphenyl)-2,2-dimethyl-propane and 1,1-bis(p-methoxyphenyl)-2,2-dimethyl-propane. These intermediate compounds include 1,1-bis(p-methylphenyl)-2,2-dimethyl-propanol-1, and 1,1-bis(p-methoxyphenyl)-2,2-dimethyl-propanol-1.

The new chemical compounds with which our invention is concerned, 1,1-bis(p-methylphenyl)-2,2-dimethyl-propane and 1,1-bis(p-methoxyphenyl)-2,2-dimethyl-propane, possess marked and effective insecticidal activity, being colorless, odorless, stable to heat, light, and chemical agents, and highly soluble in most non-aqueous solvents. They are also non-irritating and appear to have little or no mammalian toxicity.

In preparing our novel chemical compounds, we utilize as the starting materials, an alkyl ester of pivalic acid such as ethyl pivalate, which has the structural formula:

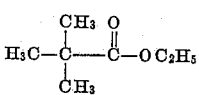

and a para methyl or methoxy substituted phenyl Grignard reagent which may be identified by the following formula:

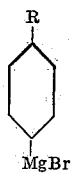

wherein R is a methyl or methoxy group.

The alkyl ester of pivalic acid may be reacted with the Grignard reagent in an ether medium. The reaction mixture is cooled during the addition of the reactants and then is allowed to stand for several hours at room temperature. The magnesium complex is decomposed with ammonium chloride solution and the solvent is removed. This results in a compound which may be identified by the following structural formula:

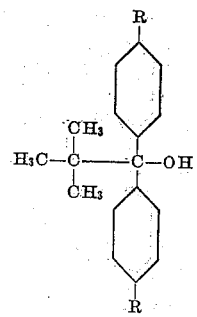

wherein the substituents R are the same and are selected from the group consisting of methyl and methoxy.

The diaryl-substituted neopentyl alcohols above are then hydrogenated in the presence of a copper chromite catalyst to produce the corresponding propane which has the formula:

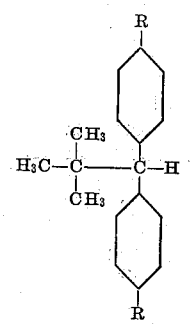

wherein R is as above. That this hydrogenation could be carried out successfully was entirely unexpected, in view of the highly hindered character of the molecule and the known tendency of neopentyl alcohols to dehydrate and rearrange particularly at elevated temperatures.

In carrying out this new hydrogenation process, it is preferred to react the propanol derivative with hydrogen at a temperature of about 175–275° C., at a pressure in excess of about 200 atmospheres, in the presence of about 5% by weight of copper chromite catalyst, and until 1 molar equivalent of hydrogen has been consumed. A total reaction period of about 3 hours is usually ample. The alcohol treated is preferably, though not necessarily, dissolved in a suitable solvent, such as a lower aliphatic alcohol. We further prefer the temperature range 200–250° C. At temperatures below about 175° C., the reaction progresses too slowly to be practicable. Above about 275° C., dehydration and rearrangement may occur.

The catalyst employed is prepared as described on p. 13 of Adkins, "Reactions of Hydrogen with Organic Compounds over Copper-Chromium Oxide and Nickel Catalysts," The University of Wisconsin Press (1937). At the end of the reaction period, the catalyst is separated from the reaction mixture, the solvent is removed by evaporation, and the residue is purified by distillation or by recrystallization from a suitable solvent.

We have found that the 1,1-diaryl-2,2-dimethyl-propanes described above possess marked and effective insecticidal activity. A remarkable feature of these compounds is the relation between the tertiary alkyl group joined to the central carbon atom and the insecticidal activity. Less highly branched alkyl groups, when substituted for the tertiary alkyl group do not produce comparable insecticidal activity. Structural isomers of the insecticidal compounds, such as 2-methyl-3,3 - bis(p - methoxyphenyl)-butane, and higher and lower homologs, such as 1,1-bis(p-methoxyphenyl)-2-methyl-propane, are ineffective. Also, we have found that the tertiary alkyl group must be adjacent to the di-aryl-substituted methenyl radical and that compounds containing intervening methylene radicals are ineffective. It further appears that the phenyl substituents must be para-substituted and that only a restricted number of radicals in this position will provide effective insecticidal compounds. It has been found, for example, that 1,1-diphenyl-2,2-dimethyl-propane and 1,1-bis(p-fluorophenyl)-2,2-dimethyl-propane are ineffective.

We have also discovered that the propane derivatives described herein may be successfully incorporated in a suitable inert solvent or mixture of solvents, or in a solid mixture, with or without other substances, such as wetting, dispersing and sticking agents. The compounds may be employed in such compositions either as the sole toxic agent or in combination with other insecticides, such as pyrethrum, rotenone, copper salts, etc., or with fungicidal or bactericidal agents, to provide compositions useful for household and agricultural dusts and sprays, textile coating and impregnation, and the like. For example, we have found that these new compounds are highly soluble in various hydrocarbon mixtures, in alcohols, in halogenated hydrocarbons, and the like, and that these compounds may be dissolved in such liquids to provide solutions of enhanced utility. The new compounds may also be placed in aqueous suspension by dispersing organic solvent solutions of the compounds in water. A very useful composition is obtained by mixing one of the new compounds with an inert, finely divided, solid diluent or carrier, such as bentonite, bole, talc, charcoal, pumice, calcium carbonate, and the like. The insecticidal compound may be admixed in its original form or in solution. In the latter case, the solvent is expelled to leave the inert solid coated and impregnated with the insecticidal compound. The foregoing compositions possess excellent stability, no reduction in activity being apparent even after long periods of storage, and are very effective in destroying injurious insects of all kinds, such as moths, mosquitos, flies, beetles, and others.

The preparation of our novel compounds possessing a pronounced insecticidal activity, and the novel intermediate chemical compounds obtained during the course of the reactions by which they are secured may be illustrated by the following specific examples. It should be noted, of course, that these examples are intended to be illustrative of the methods and procedures utilized in preparing these compounds, and that they are not intended to be restrictive or to be regarded as embodying the only way in which our novel compounds can be formed and recovered.

EXAMPLE 1

In a three-necked flask, fitted with a separatory funnel, reflux condenser and stirrer was placed magnesium turnings (1 mol). A mixture of p-bromotoluene (1 mol) and dry ether was run in and the flask warmed gently until the reaction became rapid. Stirring was then started and additional p-bromotoluene and dry ether was run in at such a rate as to cause vigorous refluxing. When the p-bromotoluene addition was complete the whole was stirred.

The flask was then cooled by immersion in an ice bath, and ethyl pivalate (0.5 mol) was added. The reaction mixture was stirred for three hours while maintaining the vessel in an ice bath. The mixture was then allowed to stand for about fifteen hours at room temperature. When the reaction flask had again been cooled by the ice-salt bath, a previously prepared aqueous ammonium chloride solution was added and a pasty solid separated. The ether layer was separated and dried with anhydrous sodium sulfate. The solvent was removed by distillation, and distillation under reduced pressure resulted in the recovery of 1,1-bis(p-methylphenyl)-2,2-dimethyl-propanol-1, having a boiling point of 165–171° C./1 mm.

*Analysis.*—Calculated for $C_{19}H_{24}O$: C, 85.04; H, 9.02. Found: C, 85.12; H, 9.02.

40 grams of 1,1-bis(p-methylphenyl)-2,2-dimethyl-propanol-1 was dissolved in ethanol and placed in a bomb, and 15 grams of barium-stabilized copper chromite catalyst was added. The mixture was treated with hydrogen at 6000 p. s. i. and 250° C. for three hours, the bomb was cooled and the catalyst was removed by filtration. The filtrate was distilled, and the fraction boiling at 144–148° C./1 mm. was collected as product. There was obtained 30 g. of 1,1-bis(p-methylphenyl)-2,2-dimethyl-propane.

*Analysis.*—Calculated for $C_{19}H_{24}$: C, 90.40; H, 9.59. Found: C, 90.60; H, 9.43.

1,1 - bis(p - methylphenyl) - 2,2 - dimethyl-propane has been tested and found to possess marked insecticidal activity as shown in Example 3 hereinafter disclosed.

EXAMPLE 2

200 grams of p-bromoanisole was converted to the p-bromoanisole Grignard reagent by the procedure described in Example 1. To the addition mixture, cooled in an ice-salt bath, was added 65 grams of ethyl pivalate. The cold solution was agitated for three hours and was then allowed to stand about fifteen hours at room temperature. Ammonium chloride solution was added. The ether layer was separated, dried over anhydrous sodium sulfate, and concentrated to dryness, in vacuo. A crude orange-colored solid weighing 146 grams was obtained. The solid was recrystallized from petroleum ether (30–60° C.) to give 1,1 - bis(p-methoxyphenyl) - 2,2 - dimethyl-propanol-1 having a melting point of 81–83° C.

Analysis.—Calculated for $C_{19}H_{13}O_3$: C, 75.97; H, 8.05. Found: C, 75.51; H, 7.84.

30 grams of 1,1-bis(p-methoxyphenyl-2,2-dimethyl-propanol-1 was dissolved in ethanol and placed in a bomb, and 10 grams of barium-stabilized copper chromite catalyst was added. The mixture was treated with hydrogen at 6000 p. s. i. and 250° C. for three hours. At the end of this period, the bomb was cooled, and the catalyst was removed by filtration. The solvent was removed from the filtrate by concentrating to dryness, and 26 grams of a granular product remained. The granular solid was recrystallized several times from petroleum ether to give 1,1-bis(p - methoxyphenyl) - 2,2 - dimethyl - propane having a melting point of 59–61° C.

Analysis.—Calculated for $C_{19}H_{24}O_2$: C, 80.24; H, 8.51. Found: C, 80.47; H, 8.22.

1,1 - bis(p - methoxyphenyl) - 2,2 - dimethyl-propane has been found to possess effective insectidal activity as shown in Examples 3, 4 and 5 hereinafter disclosed.

EXAMPLE 3

The insecticidal compounds produced as described in Examples 1 and 2 and several homologs and one isomer of the compound of Example 2 were tested for insectidal activity as follows:

Clothes moth and carpet beetle tests

The test method employed was that described by R. E. Heal in a paper entitled "Evaluating protection of fabrics from clothes moth and carpet beetle attack" (J. Econ. Ent. 35 (2), 249–52 (1942)).

Woolen fabric was impregnated with acetone solutions of the insecticides to give known concentrations on the fabric. After evaporation of the solvent, 10 larvae of the webbing clothes moth (Tineola biselliella (Hum.)) or of the black carpet beetle (Attagenus piceus (Oliv.)) were confined on weighed patches of the treated fabric for 2 weeks. After removal of the larvae the patches were again weighed. The loss in weight of the fabric is indicated as "damage" in Table I below. Weight loss greater than 10 mgm. is considered to be inadequate protection.

Cockroach and milkweed bug tests

The test method employed followed a procedure of F. C. Nelson et al., as described in a paper entitled "Evaluating liquid insecticides" (Soap 10, (10), 85 (1934)).

Adults of the German cockroach (Blatella germanica (L.)) or of the milkweed bug (Oncopeltus fasciatus (Dallas)) were anaesthetized with carbon dioxide, and measured quantities of acetone solution of the test compound were deposited on their ventral thoracic surfaces. Observations of mortality were made daily up to the end of 4 days. The results of these tests are indicated in Table I below.

TABLE I

| Compound | Clothes Moth | | Carpet Beetle | | Cockroach | | Milkweed Bug | |
|---|---|---|---|---|---|---|---|---|
| | Percent Application | Damage, mgm. | Percent Application | Damage, mgm. | Application, mg./kg. | Percent Mortality | Application, mg./kg. | Percent Mortality |
| Product of Example 1—Propane, 1,1-bis(p-methylphenyl)-2,2-dimethyl. | 0.25 | 7.5 | 1.0 | 1.7 | 2,000 | None | 2,000 | 30. |
| Product of Example 2—Propane, 1,1-bis(p-methoxyphenyl)-2,2-dimethyl. | 0.0625 | 4.1 | 0.0625 | 0.1 | 2,000 | 60 Female 100 Male | 500 | 80. |
| Propane, 1,1-diphenyl-2,2-dimethyl | 2.0 | >30.0 | 2.0 | 11.0 | 2,000 | None | 2,000 | None. |
| Propane, 1,1-bis(p-fluorophenyl)-2,2-dimethyl. | 1.0 | >75.0 | 1.0 | >25.0 | 2,000 | do | 2,000 | 10. |
| Propane, 1,1-bis(p-methoxyphenyl)-2 methyl. | 2.0 | 7.2 | 1.0 | 7.5 | 2,000 | do | 2,000 | None. |
| Methane, bis(p-methoxyphenyl) | 2.0 | >30.0 | 2.0 | >15.0 | 2,000 | do | 2,000 | Do. |
| Ethane, 1,1-bis(p-methoxyphenyl) | 2.0 | >25.0 | 2.0 | >15.0 | 1,600 | do | 2,000 | Do. |
| Butane, 2-methyl-3,3-bis(p-methoxyphenyl). | 2.0 | >30.0 | 2.0 | >30.0 | 2,000 | do | 1,600 | Do. |
| Butane, 1,1-bis(p-methoxyphenyl)-3,3-dimethyl. | 2.0 | >25.0 | 2.0 | >15.0 | 2,000 | do | 2,000 | Do. |

EXAMPLE 4

1,1 - bis(p - methoxyphenyl) - 2,2 - dimethyl-propane, produced as described in Example 2, was tested on flies as follows:

Plate test

Using a test patterned on that described by Barber and Schmitt ("Houseflies resistant to DDT residual sprays," N. J. Agr. Exp. Sta. Bull. 742 (1948)), adults of the housefly, 5 days of age, were confined for a 15 minute period on glass plates on which the insecticide had been deposited in the amount of 100 mgm. per square foot. In 30 minutes after initial exposure, 42% of the flies were paralyzed and at the end of 24 hours, 100% of the flies were dead.

Spray test

Adult flies in screen cages were sprayed with 6 different concentrations (0.25–3.0%) of insecticide in refined petroleum distillate solution. The sprays were applied in a spray tower similar to that described by N. A. Waters ("Chemical control of insects," Publication No. 20, p. 115, Amer. Assoc. Adv. Science (1943)) using 5 seconds at 10 p. s. i. pressure to apply 1.9 ml. spray per cage of 50 insects. The toxicity curve established by these tests indicated that the concentration of insecticide giving an L. D. 50 was 0.38–0.4%.

EXAMPLE 5

The insecticidal compounds produced as described in Examples 1 and 2 were subjected to a larvicide test as follows:

Three-day old larvae of the yellow-fever mosquito (Aedes aegypti (L.)) were placed in water to which was added an acetone solution of the test compound in the amount of 1% of the water. Observations of mortality were made in 24 hours. 100% mortality was observed when 10 and 0.625 p. p. m., respectively, of 1,1-bis(p-methylphenyl)-2,2-dimethyl-propane and 1,1 - bis(p - methoxyphenyl)-2,2-dimethyl-propane were present.

It should be understood that various changes may be made in our process as herein described without affecting the improved results attained. Various changes in procedure differing from those herein given as illustrative of the preferred embodiments of our invention may be made without departing from the scope thereof. Accordingly, the scope of our invention is to be determined in accordance with the prior art and appended claims.

We claim:

1. The process that comprises reacting 1,1-bis-(p - methylphenyl) - 2,2 - dimethyl - propanol - 1 with hydrogen in the presence of a copper chromite catalyst and recovering 1,1-bis(p-methylphenyl)-2,2-dimethyl-propane.

2. The process that comprises reacting 1,1-bis(p - methoxyphenyl) - 2,2 - dimethyl - propanol-1 with hydrogen in the presence of a copper chromite catalyst at 6000 pounds per square inch pressure and 250° C. and recovering 1,1-bis(p-methoxyphenyl)-2,2-dimethyl-propane.

References Cited in the file of this patent

UNITED STATES PATENTS

| Number | Name | Date |
|---|---|---|
| 2,137,407 | Lazier | Nov. 22, 1938 |
| 2,221,271 | Smith et al. | Nov. 12, 1940 |
| 2,331,265 | Coleman et al. | Oct. 5, 1943 |
| 2,334,100 | Ipatieff et al. | Nov. 9, 1943 |
| 2,399,716 | Adams | May 7, 1946 |
| 2,504,382 | Bousquet | Apr. 18, 1950 |
| 2,572,141 | Harris | Oct. 23, 1951 |
| 2,582,867 | Hartough et al. | Jan. 15, 1952 |
| 2,641,618 | Rogers et al. | June 9, 1953 |

OTHER REFERENCES

Bielstein, Band VI, First Supplement, page 495, Compound No. 3 (1931), Springer, Berlin, Germany.